United States Patent

[11] 3,540,413

| [72] | Inventor | Albert Rene Joseph Castaigne |
| | | Toulouse, France |
| [21] | Appl. No. | 805,494 |
| [22] | Filed | March 10, 1969 |
| [45] | Patented | Nov. 17, 1970 |
| [73] | Assignee | Centre D'Etudes Pour L'Industrie |
| | | Pharmaceutique |
| | | Toulouse, France |
| | | a French body corporate |
| [32] | Priority | Aug. 2, 1968 |
| [33] | | France |
| [31] | | 161,750 |

[54] APPARATUS FOR STUDYING THE BEHAVIOUR OF LABORATORY ANIMALS
14 Claims, 6 Drawing Figs.

[52] U.S. Cl. ..................................... 119/1, 119/29
[51] Int. Cl. ..................................... A01k 29/00
[50] Field of Search ........................... 119/1, 29

[56] References Cited
UNITED STATES PATENTS

| 3,057,328 | 10/1962 | Swartz .......................... | 119/29 |
| 3,100,473 | 8/1963 | Kissel ........................... | 119/1 |
| 3,304,911 | 2/1967 | Hakata et al. ................. | 119/1 |
| 3,494,329 | 2/1970 | Frieberger et al. ............ | 119/1 |

*Primary Examiner*—Aldrich F. Medbery
*Attorney*—Young & Thompson

ABSTRACT: An apparatus for studying the behaviour of laboratory animals. The apparatus comprises an enclosure of electrically insulating material constituting a cage and located in a low-intensity alternating current electric field and at least one pair of electrically conductive devices insulated from each other and located in the enclosure to be touched by the animal. An electronic detection circuit is connected to the conductive devices and to an indicator device so that each time the animal comes in contact with either of the conductive devices a signal is applied to the electronic detection circuit and energizes the indicator device.

Patented Nov. 17, 1970
3,540,413
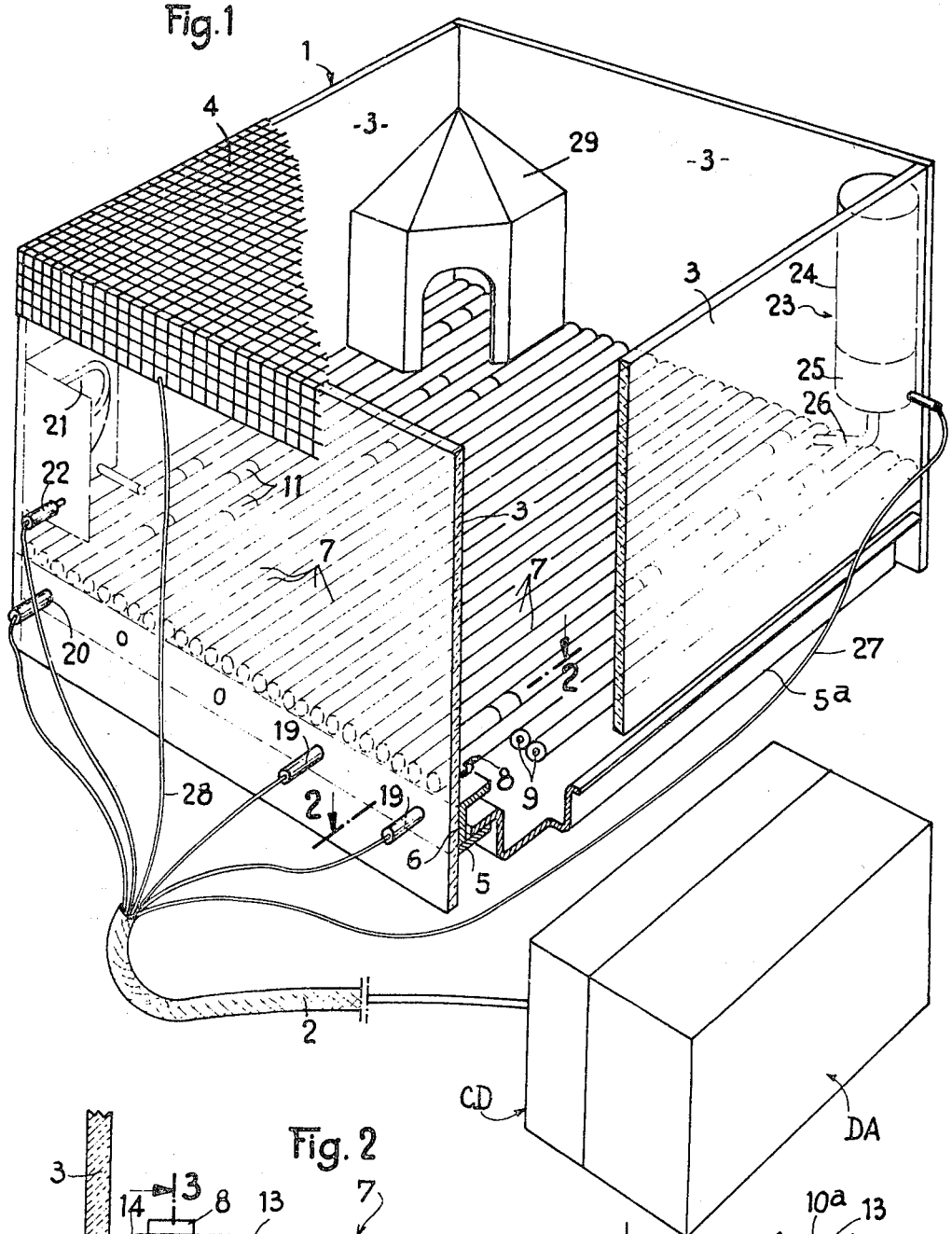
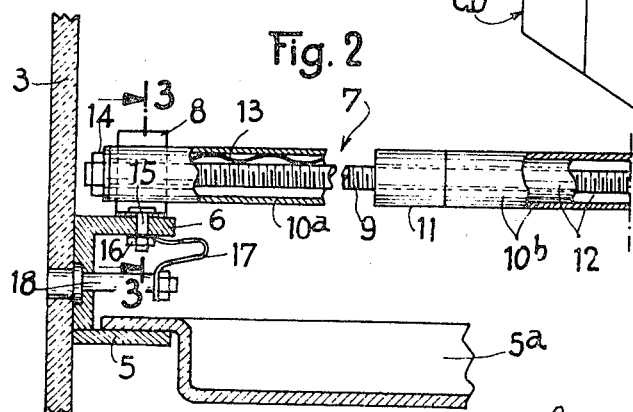
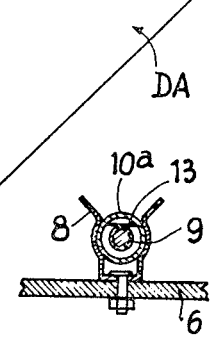
INVENTOR
ALBERT RENE JOSEPH CASTAIGNE
By Young & Thompson
ATTYS.

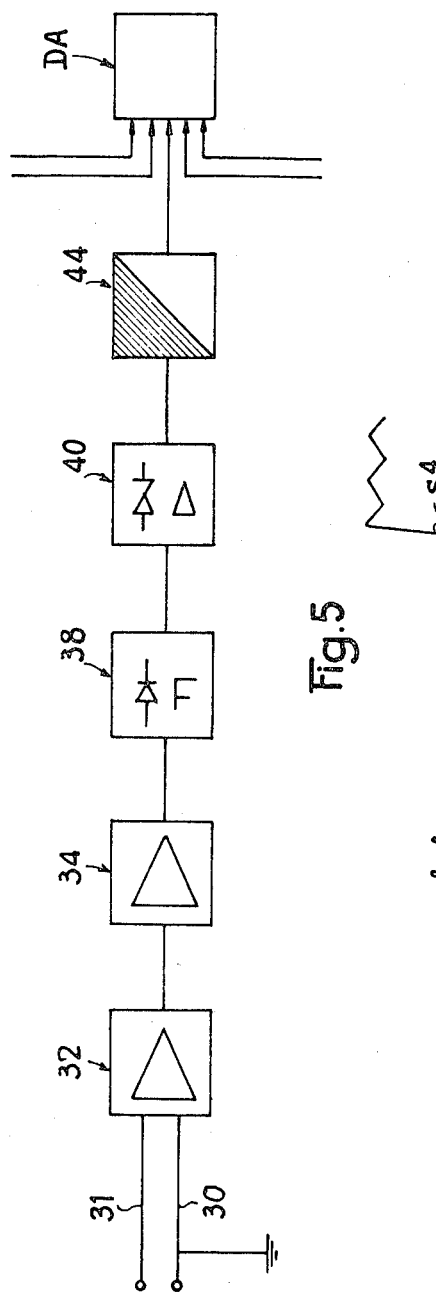

APPARATUS FOR STUDYING THE BEHAVIOUR OF LABORATORY ANIMALS

The present invention relates to an apparatus for studying the behaviour of animals and more particularly to an automatic behaviour analyser adapted to count, for example, a number of passages in the vicinity of a fixed point, or a number of given actions of one or more laboratory animals, whereby their activity can be directly ascertained as a function of time.

Various apparatuses for this purpose exist which comprise photoelectric cells, rocking switches, swinging floors, or a combination of these devices. One can imagine the complexity of such apparatuses which not only are very delicate in operation, but present insurmountable problems as concerns the cleaning and upkeep of the cages.

Further, the conspicuous equipment places the animal in unusual conditions of life, tends to disturb its behaviour and does not facilitate the interpretation of the results.

The object of the present invention is to provide a studying apparatus of the type mentioned hereinbefore which does not have this drawback and in particular does not affect in any manner the environment of the animal.

The apparatus for studying the behaviour of laboratory animals according to the invention comprises in combination an enclosure of insulating material constituting a cage and located in any low-intensity alternating current electric field, and provided with at least one pair of electrically conductive devices insulated from each other and capable of being touched by the animal, and an electronic detection circuit connected to said conductive devices and to an indicator device whereby, each time the animal comes in contact with either of said conductive devices, a signal is applied to the electronic detection circuit and energizes said indicator device.

According to a preferred embodiment of the invention, said alternating electric field is produced by supply lines connected to the mains supply which is in the vicinity of said apparatus. One of said conductive devices is preferably earthed.

It is known that the electric supply lines connected to the mains create in the building or premises to which they supply current a low-intensity alternating electric field having the frequency of the mains, for example 50 Hz. An electric conductor can capture a part of the energy of this field so that a difference of potential is produced between any conductors placed in the field. Now, any body possessing a certain conductivity, for example the body of an animal being analysed, is capable of disturbing this difference of potential according as it comes in contact with one or the other of the two conductors. According to the invention, it is this disturbance representative of the behaviour of the animal which is detected and indicated to provide information of its behaviour.

Further features and advantages of the invention will be apparent from the ensuing description with reference to the accompanying drawings.

In the drawings:

FIG. 1 is a diagrammatic perspective view of a studying apparatus according to one preferred embodiment of the invention;

FIG. 2 is a sectional view on an enlarged scale, taken along line 2-2 of FIG. 1, of the mounting and electric connection of the bars constituting the bottom of the cage shown in FIG. 1;

FIG. 3 is a sectional view taken along line 3-3 of FIG. 2;

FIG. 4 is a simplified diagram of a detection path of the electronic circuit of the apparatus shown in FIG. 1;

FIG. 5 shows the signals from each of the elements represented by the rectangles shown in FIG. 4.

Figure 6:
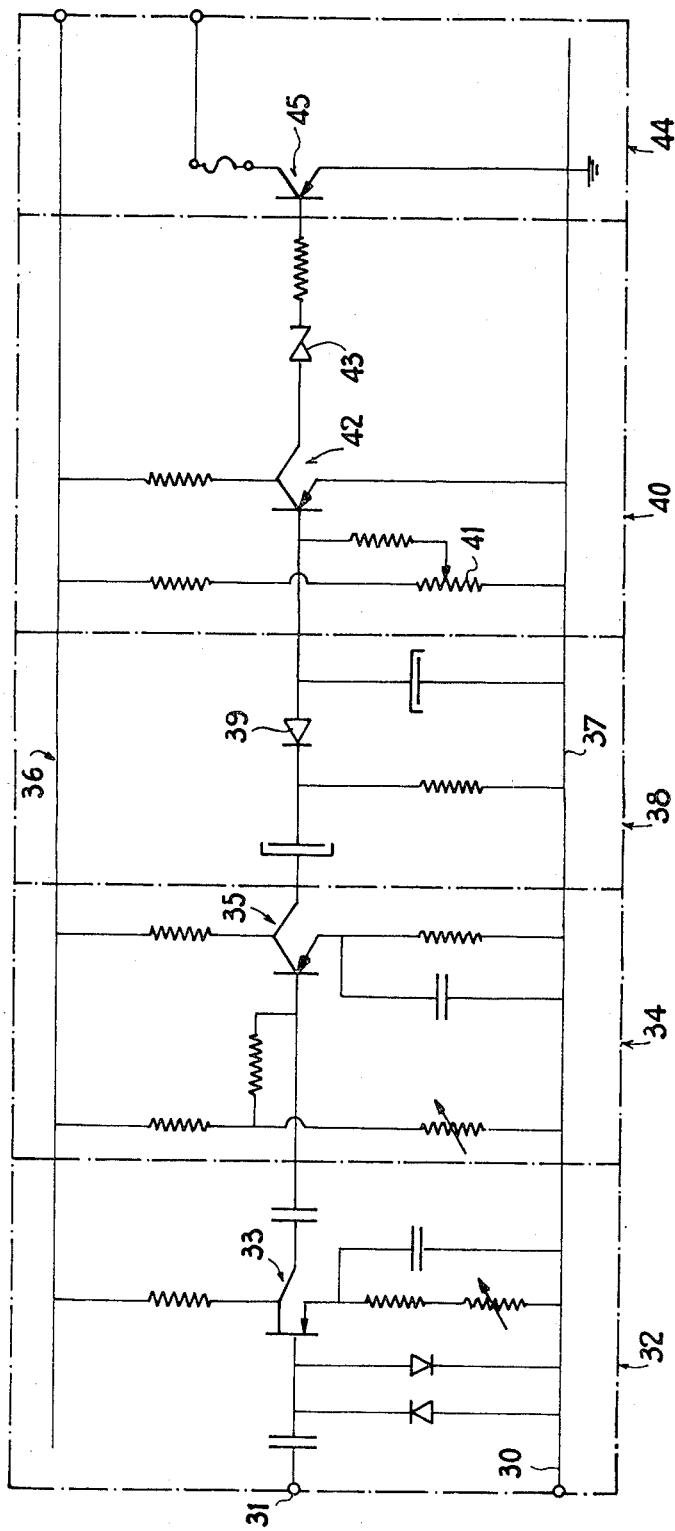
FIG. 6 is a detail diagram of the circuit shown in FIG. 4.

In the embodiment of the invention shown in the drawings, the studying apparatus comprises an enclosure or cage 1 (FIG. 1) which is connected by a screened cable 2 to an electronic device comprising a detection circuit CD and an indicator device DA, the latter being for example in the form of a numerical counter, a paper recorder or like indicator device.

The cage 1 comprises four vertical walls 3 of rot-proof material, as transparent plastics material, a cover 4 consisting of a grill of conductive stainless material, as stainless steel, the edges of the grill being formed over onto the walls 3.

The front and rear walls are provided near their lower edge with a horizontal strip 5 (FIGS. 1 and 2) on which bears the corresponding edge of a tray 5a for receiving waste matter. A bracket 6 of insulating material bears on the upper face of the horizontal strips 5.

The bottom of the cage comprises a series of horizontally disposed and parallel bars 7 bearing on the bracket 6, the ends of each bar being introduced in a detachable manner in elastically yieldable clips 8 fixed to the bracket 6. Each bar 7 consists of an inner screwthreaded rod 9 on which are mounted a plurality of sections of conductive tubes 10a, 10b...of stainless steel which are for example separated by insulating collars 11. Some of the sections, for example sections 10b, are completely insulated from the inner rod 9 by insulating bushes 12 whereas others, for example sections 10a, are electrically connected to this rod through corrugated elastically yieldable strips 13. Each bar assembly is rendered rigid by nuts 14 screwthreadedly engaged on the ends of the rod 9.

Each of the elastically yieldable clips 8 is fixed to the bracket 6 by a screw 15 and a nut 16, the latter also clamping a terminal to which is connected a wire 17. The bar 7 shown in FIG. 2 is thus electrically connected to a socket 18 in which a plug 19 can be introduced (FIG. 1) from outside, this plug being inaccessible by the animal. In the illustrated embodiment, only two bars are thus individually connected to a plug. The other bars are connected to each other through electric connections (not shown) which connect the screws 15 to each other and to a plug 20 (FIG. 1) which is connected to the earth of the electronic circuit CD through a cable 2.

There is thus formed in the bottom of the cage an arrangement of earthed conductive parts and another arrangement of conductive parts, the assembly thus constituting a pair of conductive devices. Owing to this particular construction of the bars and the convenient manner of fixing them, it is possible to modify as desired the arrangement of the conductive devices thus constructed so that the cage can be very easily adapted to the particular study to be carried out.

One corner of the cage is occupied by a feeding trough 21, for example of stainless steel, which is electrically connected to a plug 22. A drinking trough 23 is disposed in the opposite corner and comprises a tank 24 of plastics material provided with a cap 25, for example of stainless steel, carrying a tube 26. A connecting wire 27 from the cable 2 is soldered to this cap. Another wire 28 from the cable 2 is connected to the grill 4. Thus, the feeding trough 21, the drinking trough 23 and the grill 4 constitute with the respective bars 7 of the bottom as many pairs of conductive devices of utility in the studying of the behaviour of the animal.

Another corner of the cage is occupied by a kennel 29.

The cable 2 thus comprises six wires, the one connected to the plug 20 being earthed. Due to the fact that the whole of the apparatus is placed in an environment in which prevails an electric field produced by the supply lines of the mains, there exists between each of the five wires and the earthed wire a difference of potential of a certain magnitude or, in other words, between the conductive devices 4, 21 and 23 and the bars 7 connected to the plugs 19, on one hand, and the other bars 7 connected to the plug 20, on the other hand, differences of potential which may be disturbed by the animal living in the cage.

The plugs 19, 22 and the wires 27 and 29 are connected to the detection circuit CD which comprises, in the presently described embodiment, five identical detection paths, only one of which is shown in FIGS. 4 and 6.

Thus, each of these paths, which are preferably disposed on a printed circuit board, comprises two input terminals 30, 31 respectively connected to the earth (plug 20) and to one of the conductive devices of the cage 1. The signals at the terminals 30, 31 are first amplified by an amplifying stage 32 having a very high input impedance which consequently practically does not load the circuit to which it is connected. The high impedance is obtained preferably by means of a field-effect transistor 33 having a very low noise level. The amplifying stage 33 is followed by another amplifying stage 34 which serves to bring the signal from the stage 32 to a suitable level by means of a transistor 35. The transistors 33 and 35 are polarized in the known manner by means of resistors, some of which are connected to a DC supply line 36 and others are connected to an earth line 37.

A detection stage 38 comprising a diode 39 rectifies and filters the signal from the stage 34. Thereafter, the signal is applied to a circuit 40 having an adjustable threshold, comprising in particular an adjusting potentiometer 41, a transistor 42 and a Zener diode 43. A switching stage 44 comprising a transistor 45 which can be either turned off or turned on in which latter case it is saturated, furnishes a logic signal which is "+1" or "−1" according as the threshold determined by the circuit 40 is exceeded or not in either direction. This logic signal is applied to the indicator device DA.

FIG. 5 shows the respective output signals $S^1$ to $S^5$ of the stages 32, 34, 38, 40 and 44.

Note that the indicator device DA can be in several forms. For example, it can comprise a numerical counter merely indicating the total number of times that the animal comes in contact with the corresponding conductive device of the cage or, a paper-band recorder on which are shown the precise moments in time during which the animal comes in contact with this conductive device, it of course being possible to provide the recorder with as many inputs as desired.

The whole of the conductive device and the bars 7 connected to earth receive a certain electric energy giving rise to a difference of potential at the terminals 30 and 33 which prevails therein even when the conductive device is not touched by the animal. Now, this signal gives the threshold of the circuit 40 a level which imposes a position of a logic level "0" on the switching stage 44. In other words, such a signal corresponding to the energy sensed solely by the conductive device is incapable of passing the threshold and triggering the stage 44. The animal, in touching either the conductive device (that is, one or the other of the bars 7 connected to the plugs 19, the drinking trough 23, the feeding trough 21 or the grill 4) or the earthed bars 7, can modify the level of the input signal in either direction. The threshold of the circuit 40 can be adjusted in two ways so that is can be passed in either of these directions.

In order to raise the level of the input signal correspondingly to the logic level "0" of the switching stage 44, it is possible to introduce in the cable an insulated additional wire (not shown) connected to the mains.

It is clear from the foregoing description that the studying apparatus according to the invention remedies by its ease of utilization all the drawbacks of known apparatuses. In particular, it will be observed that:

The functions of the animal can be studied separately (feeding, thirst, sleep, vertical or horizontal activity) or together, or, as a function of time, depending on the type of indicator device employed.

Cage maintenance is very easy since the apparatus is constructed of stainless metal and rot-proof materials.

As no sensor liable to get out of order or deteriorate is employed, the results obtained are reliable and certain.

It is not sensitive to natural or artificial outside conditions (for example, dampness, temperature or lighting).

The sensitive conductive devices have natural shapes which merge into the environment or which are objects to which the animal is accustomed.

The detachable circuit elements are inaccessible to the animal.

Although a specific embodiment of the invention has been described, many modifications and changes may be made therein without departing from the scope of the invention as defined in the appended claims.

I claim:

1. An apparatus for studying the behaviour of a laboratory animal, said apparatus comprising in combination an enclosure of electrically insulating material constituting a cage and located in any low-intensity alternating current electric field, at least one pair of electrically conductive devices insulated from each other and located in the enclosure in significant positions to be capable of being touched by the animal, an indicator device and an electronic detection circuit connected to said conductive devices and to said indicator device constituting an animal position determining means each time an animal comes in contact with either of said conductive devices to produce a signal which is applied to the electronic detection circuit for energizing said indicator device.

2. An apparatus as claimed in claim 1, wherein said electric field is that produced by supply lines connected to the mains supply in the vicinity of said apparatus.

3. An apparatus as claimed in claim 1, wherein one of said conductive devices is earthed.

4. An apparatus as claimed in claim 1, wherein one of said conductive devices is provided in the bottom of said enclosure.

5. An apparatus as claimed in claim 1, wherein one of said conductive devices consists of a metal feeding trough.

6. An apparatus as claimed in claim 1, wherein one of said conductive devices consists of a metal drinking trough.

7. An apparatus as claimed in claim 1, wherein one of said conductive devices consists of a metal grill forming the roof of said enclosure.

8. An apparatus as claimed in claim 4, wherein said enclosure has a bottom comprising a series of electrically insulated cylindrical parallel bars, each bar comprising portions which are electrically insulated from each other.

9. An apparatus as claimed in claim 8, wherein each bar comprises an inner conductive screwthreaded rod and a plurality of cylindrical conductive sections surrounding said rod, electrically insulating collars interposed between said sections, some of said sections being electrically connected to said rod through corrugated elastically yieldable strips interposed between the rod and the respective section, and other of said sections being insulated from said rod by insulating bushes.

10. An apparatus as claimed in claim 8, wherein said bars are fixed in position by means of elastically yieldable clips mounted on brackets of insulating material.

11. An apparatus as claimed in claim 1, wherein said electronic detection circuit comprises, in respect of said pair of conductive devices, an amplifier having a high input impedance, a rectifier, a threshold circuit and a switching circuit, the latter being connected to said indicator device.

12. An apparatus as claimed in claim 1, wherein said conductive devices are of stainless steel.

13. An apparatus as claimed in claim 1, wherein said conductive devices are connected to said detection circuit through a single multiwire cable, one of the wires of which is insulated and connected to the mains.

14. An apparatus as claimed in claim 1, comprising a plurality of pairs of said electrically conductive devices.